Oct. 25, 1966   H. F. P. LE TILLY ETAL   3,281,629
CONTROL SYSTEM FOR SEQUENTIALLY ENERGIZING MOTOR PHASE WINDINGS
Filed March 27, 1963   5 Sheets-Sheet 1

Henri F. P. LeTilly
Pierre P. Curvale
INVENTORS:

BY Karl F. Ross
Attorney

Oct. 25, 1966 H. F. P. LE TILLY ETAL 3,281,629
CONTROL SYSTEM FOR SEQUENTIALLY ENERGIZING MOTOR PHASE WINDINGS
Filed March 27, 1963 5 Sheets-Sheet 2
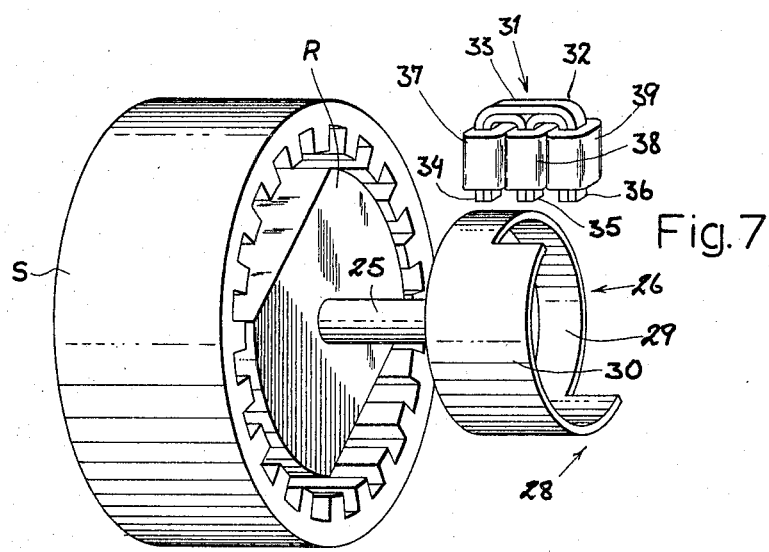
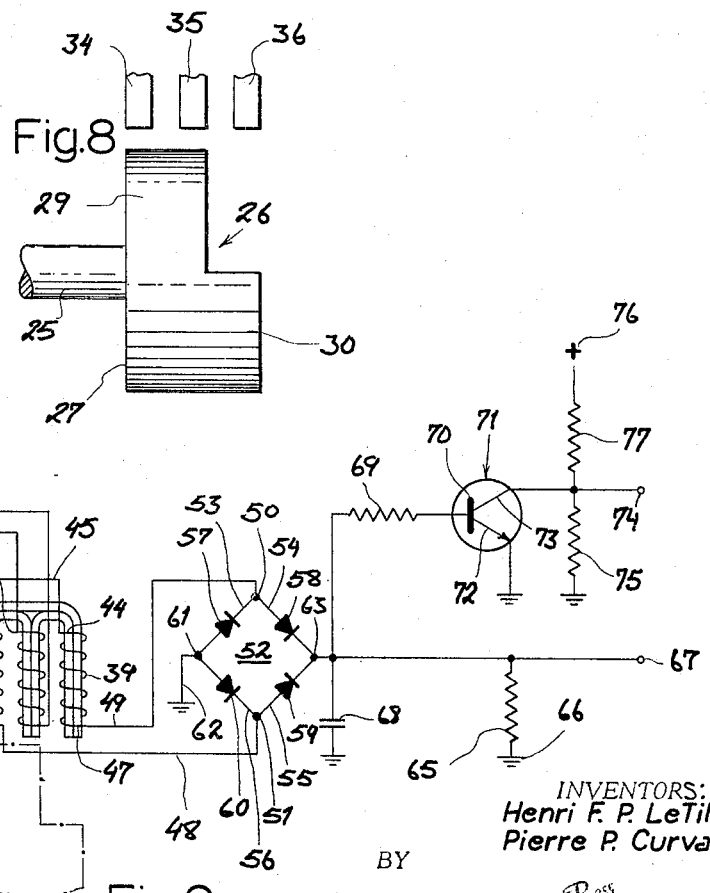
INVENTORS:
Henri F. P. LeTilly
Pierre P. Curvale
BY
Karl G. Ross
Attorney Oct. 25, 1966  H. F. P. LE TILLY ETAL  3,281,629
CONTROL SYSTEM FOR SEQUENTIALLY ENERGIZING MOTOR PHASE WINDINGS
Filed March 27, 1963  5 Sheets-Sheet 3

Fig.10

| | a | b | c | d |
|---|---|---|---|---|
| Transformer p | + | + | o | o |
| Transformer q | + | o | o | + |

Fig.11

| | a | b | c | d |
|---|---|---|---|---|
| Transformer p | + | + | o | o |
| Transformer q | o | o | o | o |
| Transformer r | o | o | o | + |
| Transformer s | o | + | + | + |

| | e | f | g | h |
|---|---|---|---|---|
| Transformer p | o | o | o | + |
| Transformer q | o | + | + | + |
| Transformer r | + | + | o | o |
| Transformer s | o | o | o | o |

Henri F. P. LeTilly
Pierre P. Curvale
INVENTORS.

BY
Karl J. Ross
Attorney

Oct. 25, 1966  H. F. P. LE TILLY ETAL  3,281,629
CONTROL SYSTEM FOR SEQUENTIALLY ENERGIZING MOTOR PHASE WINDINGS
Filed March 27, 1963

Fig. 13

| Designation of the differential transformer p | Designation of the differential transformer q | Desired direction of rotation | Winding to be energized | Directional signal | |
|---|---|---|---|---|---|
| | | | | lead 2 | lead 3 |
| + | + | forward | D | + | o |
| + | o | forward | A | + | o |
| o | o | forward | B | + | o |
| o | + | forward | C | + | o |
| + | + | reverse | B | o | + |
| + | o | reverse | C | o | + |
| o | o | reverse | D | o | + |
| o | + | reverse | A | o | + |

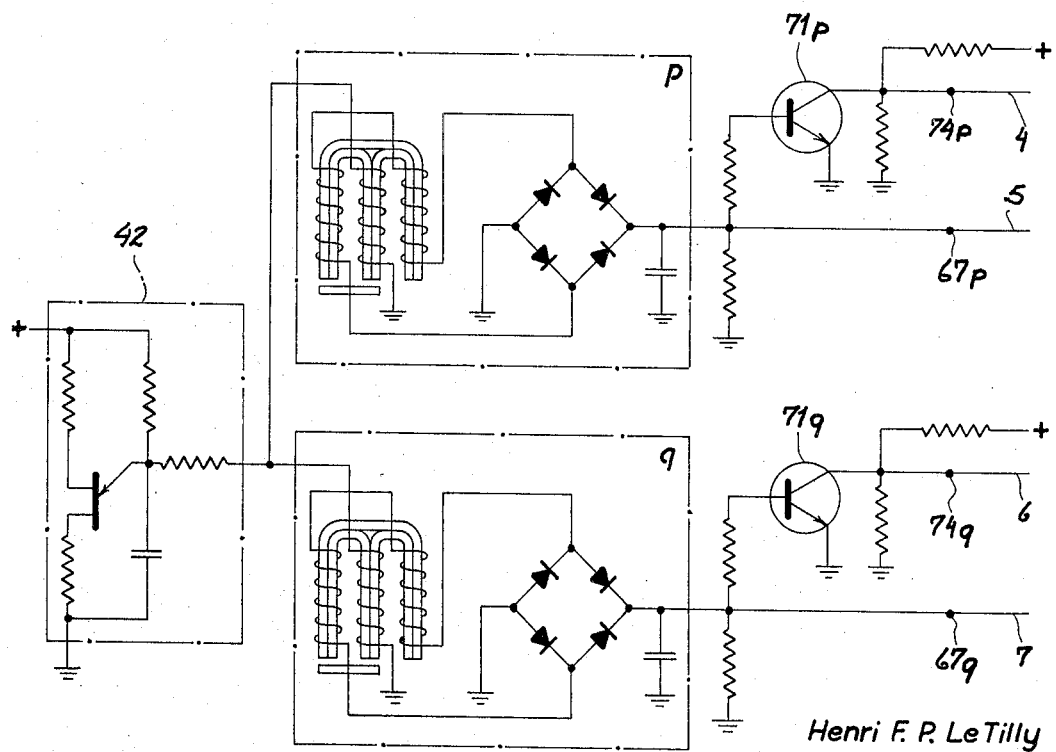

Fig. 12A

Henri F. P. Le Tilly
Pierre P. Curvale
INVENTORS.

BY

Karl F. Ross
Attorney

United States Patent Office 3,281,629
Patented Oct. 25, 1966

3,281,629
CONTROL SYSTEM FOR SEQUENTIALLY ENERGIZING MOTOR PHASE WINDINGS
Henri François Pierre Le Tilly, Paris, and Pierre Paul Curvale, Garches, France, assignors to Electronique Marcel Dassault, Paris, France, a corporation of France
Filed Mar. 27, 1963, Ser. No. 268,253
Claims priority, application France, Sept. 5, 1962, 908,691
13 Claims. (Cl. 318—138)

The present invention relates to an improved electric motor.

It is a general object of this invention to provide an electric motor having torque-speed characteristics similar to those of a separately excited direct-current motor, so as to be used in such fields where said characteristics may be advantageously turned to account, without presenting conventional drawbacks or requirements of the D.C. commutator motors.

It is a particular object of the invention to provide an electric motor, with linear torque-speed characteristics, which comprises no commutator or collector, nor contact brushes or any other contacts, so that the life of such a motor is considerably longer than that of a D.C. commutator motor and its friction torque substantially lower.

It is a further object of the invention to provide an electric motor of this type having a high efficiency, which is substantially superior to that of the asynchronous, two-phase motors sometimes used for the same purposes as the D.C. motors, on account of the shape of their torque-speed characteristics.

It is also an object of the invention to provide an electric motor capable of delivering a high power-to-weight ratio, of the same order of magnitude as that of the usual D.C. motors.

It is finally an object of the invention to provide an electric motor which is particularly well adapted for use in servo controls, especially those designed to be placed at inaccessible locations so that servicing thereof is impossible.

An electric motor according to the invention comprises a rotor comprising at least one permanent magnet whose poles are symmetrical to the axis of rotation and which cooperates magnetically with stator windings distributed around the path followed by the magnet poles, means being provided selectively feeding a direct current to one or a plurality of said stator windings in order for the rotation of the magnet to take place in the desired direction; the control of the winding supply is effected according to the rotor position, one feature of the invention being the utilization, for switching said stator windings, of transistor devices whose state of conductivity is responsive to the position of the rotor.

In this connection, another feature of the invention is the provision of elements of electronic digital computers for switching the windings according to the angular position of the magnet and of the control signal.

The invention also relates to diverse means providing said electronic computer elements with indications of the magnet position, in combination with various means for introducing the control signal.

The invention will be best understood from the following description, given by way of example, and the appended drawing wherein:

FIGURE 7 is a perspective, diagrammatic view of a rotor and stator assembly, the rotor being fitted with an angular-position-sensing device;

FIGURE 8 is a diagrammatic view, in elevation, of part of the assembly shown in FIG. 7;

FIGURE 9 is a circuit diagram of a control system, including a differential transformer also illustrated in FIG. 7;

FIGURE 10 shows various relative positions of the rotor and of two transformers;

FIGURE 11 is similar to FIGURE 10, but in connection with a system having four transformers;

FIGURE 12A is a continuation of the lower left-hand portion of the circuit arrangement of FIGURE 12; and FIGURE 13 is a table of the various switching situations in connection with the motor operation.

The driving portion of the apparatus is built in the manner of a permanent-magnet polyphase alternator. According to one embodiment of the invention, the winding is of the two-phase type. It is, however, within the scope of the invention to utilize a larger number of phase windings, i.e., windings corresponding to those of an alternator delivering more than two phase-shifted voltages. Generally, the type of winding will be selected in accordance with the permissible variation of the torque of the motor as a function of the angular position of the rotor.

Figure 1:
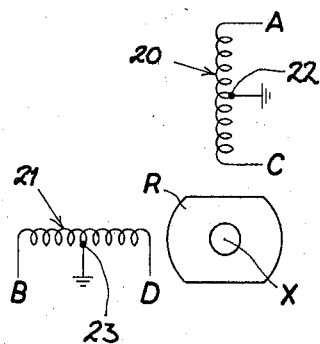
FIGURE 1 shows schematically the general arrangement of the stator and rotor of the motor according to the invention.

In FIGURE 1 a rotor R is represented as comprising a permanent magnet rotatably mounted about the axis X and cooperating with two windings 20 and 21, angularly spaced by 90° about the axis X and having their respective midpoints 22 and 23 grounded, thus defining four half-windings, i.e., A and C on winding 20, and B and D on winding 21. These four half-windings are, in turn, supplied with direct current. Thus, the stator may be considered as forming an electromagnet with four polar positions. A balanced position of magnet R will then correspond to selective energization of any half-winding.

Figure 2A:
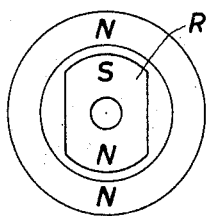
FIGURES 2A through 2D illustrate several relative positions of the rotor and of the stator.

By way of example, in FIGURE 2A the balanced position of magnet R is shown when the half-winding A is being fed, the poles of the electromagnet formed by winding A (indicated at N and S) facing, respectively, the opposite poles S and N of magnet R.

Figure 2B:
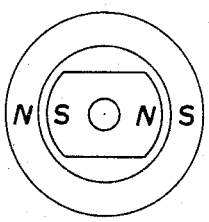

In FIGURE 2B, similarly, the balanced position of magnet R is shown when the half-winding B is traversed by current.

Figure 2C:
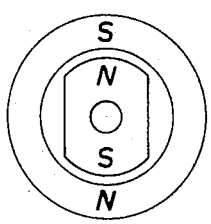
Figure 2D:
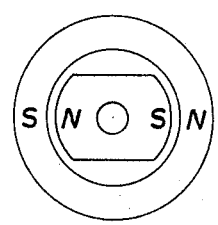

In FIGURE 2C there is shown the balanced position of magnet R with winding C energized, while FIGURE 2D illustrates the balanced position of magnet R upon energization of the half-winding D.

In order to bring about the rotation of the magnet, and in accordance with the invention, a D.C. voltage is applied to one of the windings which is substantially in phase quadrature with the magnet. Thus, if the magnet is substantially facing the half-winding A, i.e., in the position schematically illustrated in FIGURE 2A, the D.C. voltage is applied to half-winding B or to half-winding D, according to the desired direction of rotation.

Figure 3:
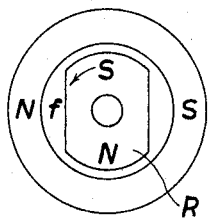
FIGURE 3 is a view similar to those of FIGURES 2A–2D, with indication of the direction of rotation of the rotor.

In FIGURE 3, the D.C. voltage is applied to half-winding B and the magnet R rotates counterclockwise, as indicated by arrow $f$.

Figure 4:
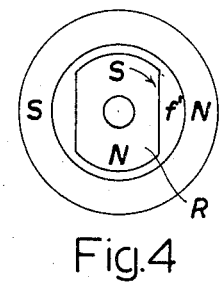
FIGURE 4 is a view similar to that in FIGURE 3, but with opposite direction of rotation.

In the position shown in FIGURE 4, wherein the voltage is applied to half-winding D, a torque is produced which urges magnet R to rotate in the opposite direction, i.e., clockwise, as indicated by arrow $f'$.

To obtain a continuous rotation of the magnet R, the half-windings—which will be in the following designated as "windings," for simplicity—are successively switched, according to the position of the magnet.

Figure 5:
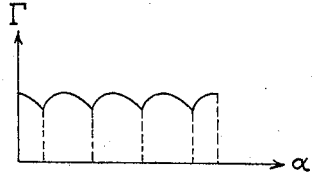
FIGURES 5 and 6 show two graphs of significance in connection with the operation of the motor.

The torque acting upon the shaft of rotor R is derived, successively, from the action of each of the windings. FIGURE 5 is a graph illustrating the variations of such torque $\Gamma$ plotted against the angular positions $\alpha$ of the magnet. The curve appears slightly modulated, the portions C', D', A', B' corresponding, respectively, to the action of the windings C, D, A, B. The torque variations depend upon the shape of the pole faces of the permanent magnet R and on the number of phases of the stator-forming winding.

The magnetic field produced by a winding is, as known, proportional to the intensity of the current flowing through said winding, as well as to the number of turns of said winding. At a given instant, the torque delivered by the motor as specified is thus proportional to the current intensity I flowing through the windings, and may be expressed as follows:

$$\Gamma = a \cdot I \qquad (1)$$

where $\Gamma$ is the value of the torque, I the intensity of the current and $a$ a constant.

When the magnet is moving, a back electromotive force E will appear across the winding, according to the relationship:

$$E = n \cdot d\phi/dt \qquad (2)$$

where $n$ is the number of turns of the winding, and $d\phi$ the variation of the magnetic flux during a time $dt$. This back electromotive force is in inverse ratio to the time of pull $dt$ of the magnet, and therefore is in direct ratio to the angular speed N; thus:

$$E = b \cdot N \qquad (3)$$

where $b$ is a constant.

The electric equation of a winding is given by the relation:

$$U = RI + E \qquad (4)$$

with U representing the potential difference across the winding and R the ohmic resistance; therefore:

$$U = R\Gamma/a + bN \qquad (5)$$

It will thus be noted that the torque is a linear function of the speed.

The starting torque, for $N=0$, is therefore proportional to the voltage U applied across the winding.

The no-load speed, i.e. for zero torque, is also proportional to voltage U. The motor according to the invention has thus the characteristics of a D.C. motor with separate excitation.

Figure 6:
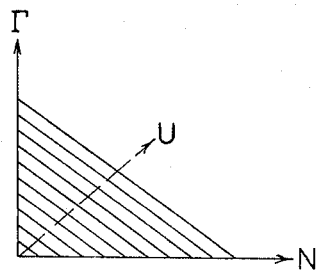

In FIGURE 6 there are shown a number of characteristic curves, representative of the values of the torque $\Gamma$ as a function of the speed N, for increasing values of the voltage U applied across the winding.

In a motor unit according to the invention, the permissible current flow through the windings is limited on account of heating conditions, and not because of any iron saturation. Such a motor thus can achieve a high torque during a limited interval of time, thereby rendering highly advantageous the application thereof to servo-systems and related fields.

The efficiency of such a motor is markedly superior to that of an asynchronous motor for the control of servo-systems, the latter type of motor providing an adequate torque-speed characteristic only at the cost of a loss of power through ohmic losses in the rotor.

The switching of the windings may be effected by means of photoelectric cells, Hall-effect probes etc. According to one embodiment of our invention, to be described more fully hereinafter, the switching is controlled from a magnetic position detector of the rotor. This detector includes a differential transformer, wound around an E-shaped core. Reference in this connection will now be made to FIGURES 7 through 9.

Integral with rotor R, rotating inside stator S, is a shaft 25 carrying a cup-shaped armature member 26, of soft steel for instance, coaxial with said shaft, on which it is secured by its bottom portion 27; the stepped rim 28 of member 26 has a cut-away part 29 which, extending over an angle of 180°, is of a lesser height than the remaining portion 30, extending over the other half of its circumference. The side wall of the armature 26 moves past and in front of a transformer 31 whose magnetic path or core 32 is E-shaped and formed with a leg 33 from which depend three branches 34, 35, 36, branches 34 and 35 facing the continuous cylindrical portion of the side wall of the armature (between the limiting planes of part 29) whereas branch 36 is aligned with the semi-cylindrical step formed by the portion thereof. Coils 37, 38 and 39 are wound, respectively, around branches 34, 35 and 36, the central coil 38 having its ends connected by leads 40 and 41 to an alternating-voltage generator such as, for instance, an oscillator 42. Coils 37 and 39 are connected in opposing relationship. Their ends 43 and 44 are interconnected through a lead 45 and their two ends 46 and 47 are connected through leads 48 and 49 to two diagonally opposite junctions 50 and 51 of a rectifier bridge 52 whose arms 53, 54, 55, 56 each include a rectifying device represented by a diode 57, 58, 59 and 60, respectively. One other junction 61 of the bridge is grounded through a lead 62. The remaining junction 63 is connected to one end 64 of a resistance 65 whose other end 66 is grounded, end 64 being connected to an output lead 67. A capacitor 68 is provided between junction 63 and ground, junction 63 being also connected, through a resistor 69, to the base electrode 70 of a transistor 71 whose emitter electrode 72 is grounded and whose collector electrode 73 is connected to the end 74 of a second resistor 75 the other end of which is grounded, the junction 74 being connected, as shown, to a source 76 of positive potential through a resistance 77. R-C network 65, 68 operates in known manner as an integrating circuit.

When the reduced peripheral portion 29 of the armature 26 is the one facing transformer 31, the electromagnetic coupling of branches 34 and 35 is tighter than that of branches 35 and 36, thence the electromotive force generated in coil 37 is greater than that produced in coil 39; an A.C. voltage will appear between the junctions 50 and 51 and, consequently, the junction 63 is driven positively with reference to ground, the resulting potential difference across resistance 65 appearing at output 67.

On the other hand, when the axially projecting portion 30 of armature 26 is the one facing the differential transformer 31, the coupling conditions of branches 34 and 36 relative to the central branch 35 are the same and since the coils 37 and 39 are connected in series-opposed relationship, no voltage will appear between junctions 50 and 51; output lead 67 will then be at zero potential. The transistor 71, which in the previous situation was in conductive state so that a current flow was established from the positive pole 76 through the transistor to ground (resistor 75 being short-circuited), has now a resistance which becomes extremely high and thereby, when the junction 63 is at ground potential, current will now flow through resistor 75 and a positive voltage will be present at the output 74.

Thus, according to whether the edge 29 or the edge 30 of the rim of the armature 26 confronts the differential transformer, i.e. whether the magnet R has one of its poles facing one or the other half of stator S, there will be either a positive voltage at the output 67 and a zero voltage at the output 74, or else a zero voltage at the output 67 and a positive voltage at output 74.

The frequency of oscillator 42 is selected sufficiently high for the time constant of the detector just described including the R-C network 65, 68 to be low relative to the transit time of the magnet from one stator pole to the other. For instance, with a speed of rotation of 50 r.p.s. (3000 r.p.m.), the transit time from one pole to the other is 0.005 second. Thus, an oscillator frequency of 4,000 c.p.s. is quite suitable.

The transistor 71 could also be omitted, the device then comprising but a single output 67.

FIGURE 10 illustrates an embodiment wherein the armature 26 cooperates with two differential transformers each having an E-shaped magnetic core, i.e., a first transformer $p$ and a second transformer $q$ angularly spaced by 90° from each other. In the position illustrated in FIGURE 10A, the projecting portion 30 of the armature confronts the two transformers, as symbolized by the hatched semiannular section; a positive potential is present at the output terminal 74 (FIG. 9) of the detector circuit associated with transformer $p$ and at the corresponding terminal associated with transformer $q$, as indicated by a + sign in the column beneath the schematic view.

In the position illustrated in FIGURE 10B, wherein the projecting rim 30 faces the transformer $p$ but not the transformer $q$, a positive potential is present at the terminal 74 of transformer $p$, while the corresponding terminal of transformer $q$ is at zero potential as indicated by the symbol 0 in the column underneath.

In the position shown in FIGURE 10C, zero potential will be present both at the terminal 74 of transformer $p$ and at the corresponding terminal of transformer $q$.

In the position illustrated in FIGURE 10D, zero potential is present at the terminal 74 of transformer $p$ and a positive potential is present at the corresponding terminal of transformer $q$.

In FIGURE 11, which illustrates a further embodiment of the invention, the armature is formed with an axially projecting step portion 82 extending over substantially 120°, i.e. over an angular range between 90° and 180°, the reduced rim portion 83 extending over the remainder of the circumference. Four differential transformers $p$, $q$, $r$, $s$, are provided, each having an E-shaped magnetic core, these transformers being angularly equispaced about this armature by 90°.

FIGURES 11A through 11H illustrate the various positions of the rotor relative to the differential transformers, the column appearing below each position showing, again by a 0 or + sign, opposite each transformer designation, the potential of the corresponding output terminal 74. Besides the positions for which a single one of the outputs is raised to a positive potential, the others being brought to a zero potential, positions occur for which the terminals 74 of two transformers are at a positive potential and the terminals of the two others are at zero potential.

According to the invention, both in the embodiment of FIGURE 11 and in that of FIGURE 10, it is contemplated to provide means for unequivocally energizing the several stator coils in accordance with the detected rotor position. Thus, in the case of FIGURE 10, the four possible potential combinations of the two transformer outputs cause respective energization of the four coils; in the case of the embodiment illustrated in FIGURE 11, on the other hand, each transformer causes energization of a respective coil when, for instance, the output terminal of that transformer is at zero potential, the coil being deenergized when said terminal is at positive potential.

In the latter embodiment, in certain positions of the armature member, two coils are energized simultaneously; this, in fact, is no disadvantage, since the magnetic field resulting from the two windings is substantially in quadrature with the permanent magnet.

This embodiment enables a larger transformer to be utilized since the area of the pole faces of the transformer is no longer a factor in the switching from one winding to the other.

Figure 12:
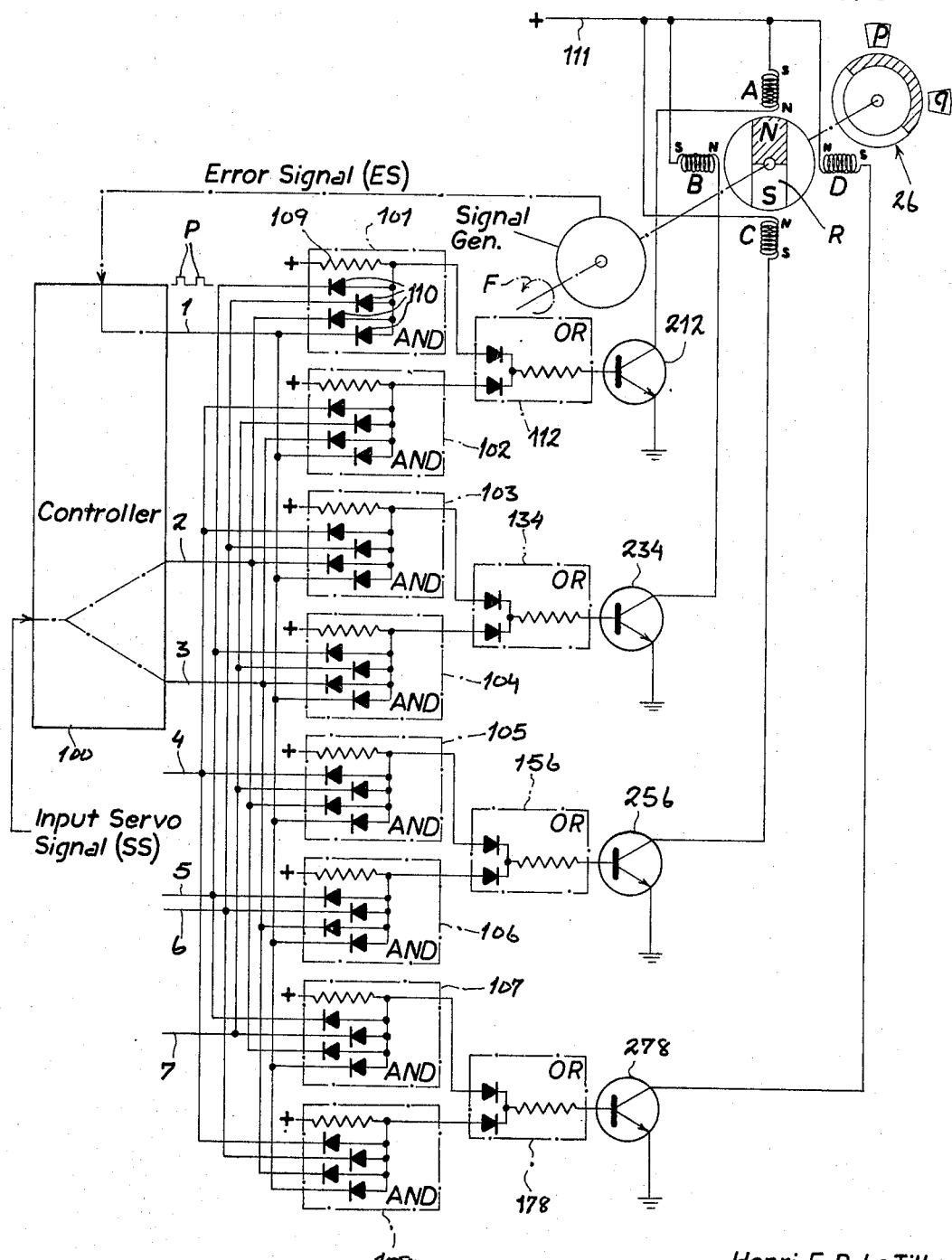
FIGURE 12 is a general layout of the arrangement according to the invention.

FIGURES 12 and 12A constitute an overall circuit diagram of a servo-control system according to this invention, with two signal-generating transformers $p$, $q$ as in FIGURE 10 this system operating in the manner of an electronic digital computer to achieve the switching of the windings according to the angular position of the magnet and in response to a servo signal SS. In this embodiment, a controller 100 applies control and directional signals to three input leads 1, 2, 3 of a logic circuit provided with four further input leads 4, 5, 6, 7. These latter leads are tied, as shown in FIG. 12A, to the output terminals 74$p$, 67$p$ of a transistor 71$p$, associated with the signal generator $p$, and the output terminals 74$q$, 69$q$ of a transistor 71$q$, associated with the signal generator $q$, these signal generators being of identical construction and including each an electromagnetic detector circuit such as the transformer 31 of FIGURES 7–9. Thus, each detector comprises a central inductance coil, acting as a primary winding, and two flanking inductance coils connected in bucking relationship, acting as secondary windings, whose magnetic path is alternately opened and closed by the armature member 26 during each revolution of the rotor R. The logic circuit further includes eight AND circuits 101, 102, 103, 104, 105, 106, 107 and 108 and, in cascade therewith, four OR circuits 112, 134, 156 and 178 working into respective transistors 212, 234, 256 and 278. The four stator windings A, B, C and D (here shown equispaced about the axis of rotor R, in contradistinction to the arrangement illustrated in FIG. 1) are respectively connected in the output circuits of the transistors 212, 234, 256 and 278. The control signal is applied to lead 1 in the shape of width-modulated pulses P, obtained, for instance, by comparing a continuous error signal ES and a saw-tooth signal. It is then necessary that the recurrence time of the pulses should be small with respect to the transit time of the magnet from one pole to the other, at the maximum operating speed of the motor. It will thus be convenient to select a pulse frequency of the same order of magnitude as the operating frequency of the oscillation 42 which supplies the differential transformers. The electric time constants of the windings and the mechanical time constant of the motor are high with respect to the recurrence time of the pulses so that only the mean value of the torque will come into play.

The servo signal SS could be a direct-current signal, or else an alternating signal, either balanced or imbalanced.

The signal indicating the desired direction of rotation is also shown delivered by the controller 100, e.g., from a transistor trigger circuit thereof, responsive to the sign of a servo-control input signal SS. The application of a signal to lead 2 corresponds, for instance, to the forward direction of rotation, which is that of the arrow F shown in FIG. 12. The application of a signal to lead 3 corresponds to the opposite direction of rotation.

Each of the AND circuits 101, 102 etc. has a resistor 109 connected between positive potential and the junction of four diodes 110 poled in forward direction. One of these diodes is connected in each case to the lead 1; a second diode is connected to the lead 2 in the case of AND circuits 101, 103, 105, 107 and to lead 3 in the case of AND circuits 102, 104, 106, 108. The two remaining diodes of each AND circuit are connected to a respective combination of two of the conductors 4–7, i.e., conductors 4 and 6 in the case of AND circuits 103 and 108, conductors 4 and 7 in the case of AND circuits 102 and 105, conductors 5 and 6 in the case of AND circuits 101 and 106, and conductors 5 and 7 in the case of AND circuits 104 and 107.

As will be readily apparent from the connections described and illustrated, any one of the AND circuits 101–108 will carry a positive potential on its output lead, extending to an associated OR circuit 112 etc., only if all input leads of the AND circuit have a positive voltage applied thereto. When this occurs, the corresponding OR circuit will apply this positive potential to the base of the associated transistor 212 etc. which, being here shown of the N-P-N type, thereupon becomes conductive and grounds the respective stator winding A, B, C or D which therefore is traversed by current from a positive bus bar 111. FIG. 13 specifies the winding thus energized for different combinations of states of conductivity of transistors 71p and 71q; a + sign in the respective column indicates, as before, that the upper terminal 74p or 74q is at positive potential while the lower terminal 64p, 64q is grounded, the symbol 0 having again the opposite connotation.

From FIGURES 12, 12A and from the table of FIG. 13 it will further be apparent that each winding A–D is energized at an instant when the magnetic field of rotor R is in quadrature therewith, the selection of one or the other quadrature winding being such that the pulsating stator field is always out of phase with the constant rotor field and leads this rotor field in the desired direction of rotation as determined by the application of positive potential to the lead 2 or 3. It will also be apparent that the intermittent energization of the phase winding will be in step with the control pulses applied to lead 1, and that the total time of energization per cycle will depend on the width of these pulses determined in turn by the aforementioned error signal ES. As the average torque will vary in accordance with the cumulative pulse width per cycle, this torque (and therefore the rotor speed) will be controlled by the error signal in a manner known per se.

Since the transistors 71p, 71q as well as 212, 234, 256 and 278 merely act as commutating switches, being either in a conductive or in a nonconductive state, the system operates at very high efficiency. The AND and OR circuits of the logic circuit of FIG. 12 can be driven at a low power level so that energy dissipation is small.

It should be noted that the branches 34–36 of the ferromagnetic core of transformer 31 lie in an axial plane of the rotor, with relative axial separation of their gaps, so that alternate opening and closing of the gap controlled by armature portion 30 (i.e. the one separating branches 35 and 36) occurs instantly in different angular positions of the rotor.

What we claim is:

1. An electric motor comprising a rotor with a constant magnetic field rotatable about an axis transverse to said field, a stator provided with a plurality of phase windings angularly spaced about said axis in a transverse plane, energizing means for said phase windings, a source of width-modulated control pulses responsive to an error signal and having a recurrence period which is short in comparison with the minimum transit time of said field from one phase winding to the next, switch means for selectively connecting said phase windings to said energizing means, and rotatable signal-generating means mechanically coupled with said rotor for controlling said switch means in dependence upon the position of said field, said switch means being connected to said source and being responsive to the output of said signal-generating means for sequentially energizing said phase windings in the presence of said control pulses with leading phase relative to said field in a desired direction of rotation.

2. A motor as defined in claim 1 wherein said rotor is a permanent bar magnet.

3. An electric motor comprising a rotor with a constant magnetic field rotatable about an axis transverse to said field, a stator provided with a plurality of phase windings angularly spaced about said axis in a transverse plane, energizing means for said phase windings, switch means for selectively connecting said phase windings to said energizing means, an armature member rotatably coupled with said rotor for entrainment thereby, and electromagnetic detector means fixedly positioned adjacent said armature member for controlling said switch means by the transmission of switching signals indicative of the position of said field, said switch means being responsive to said switch signals for sequentially energizing said phase windings with leading phase relative to said field in a desired direction of rotation, said detector means comprising transformer means having primary and secondary winding means in a common axial plane, core means for said winding means forming a magnetic path alternately openable and closable by said armature member during a revolution of said rotor, and oscillator means connected across said primary winding means for inducing in said secondary winding means an output voltage depending upon the angular position of said rotor.

4. A motor as defined in claim 3 wherein said primary winding means comprises a central inductance coil and said secondary winding means comprises two outer inductance coils flanking said central coil and connected in bucking relationship with each other, said core means comprising an element with three parallel branches respectively enveloped by said coils, the central branch of said element being separated from one of the outer branches thereof by an air gap proximal to said armature member, the latter having an arcuate peripheral wall portion registering with said gap during a fraction of a revolution of said member.

5. A motor as defined in claim 4 wherein said central branch is separated from the other outer branch of said element by another air gap axially spaced from the first-mentioned air gap, said armature member having a cylindrical wall portion registering with said other gap during a complete revolution of said member.

6. A motor as defined in claim 3, further comprising rectifying and integrating means for said output voltage connected to said secondary winding means.

7. An electric motor comprising a rotor with a constant magnetic field rotatable about an axis transverse to said field, a stator provided with a plurality of pairs of radially aligned phase windings angularly spaced about said axis in a transverse plane, energizing means for said phase windings, switch means for selectively connecting said phase windings to said energizing means, an armature member rotatably coupled with said rotor for entrainment thereby, and at least one pair of electromagnetic detectors fixedly positioned at angularly spaced locations adjacent said armature member for controlling said switch means by the transmission of different signal combinations indicative of the position of said field, said switch means being responsive to said signal combinations for sequentially energizing said phase windings with leading phase relative to said field in a desired direction of rotation, said detector means comprising transformer means having primary and secondary winding means in a common axial plane, core means for said winding means forming a magnetic path alternately openable and closable by said armature member during a revolution of said rotor, and oscillator means connected across said primary winding means for inducing in said secondary winding means an output voltage depending upon the angular position of said rotor.

8. An electric motor comprising a rotor with a constant magnetic field rotatable about an axis transverse to said field, a stator provided with a plurality of phase windings angularly spaced about said axis in a transverse plane, energizing means for said phase windings, a source of width-modulated control pulses responsive to an error signal and having a recurrence period which is short in comparison with the minimum transit time of said field from one phase winding to the next, a source of directional signals, switch means for selectively connecting said phase windings to said energizing means, and rotatable signal-generating means mechanically coupled with said rotor for controlling said switch means in dependence upon the position of said field, said switch means being connected to said sources and being responsive to the output of said signal-generating means for sequentially energizing said phase windings in the presence of said control pulses with leading phase relative to said field in a direction of rotation determined by said directional signals.

9. An electric motor comprising a rotor with a constant magnetic field rotatable about an axis transverse to said field, a stator provided with a plurality of phase windings angularly spaced about said axis on a transverse plane, energizing means for said phase windings, a source of width-modulated control pulses responsive to an error signal and having a recurrence period which is short in comparison with the minimum transit time of said field from one phase winding to the next, switch means for selectively connecting said phase windings to said energizing means, an armature member rotatably coupled with said rotor for entrainment thereby, and electromagnetic detector means fixedly positioned adjacent said armature member for controlling said switch means by the transmission of switching signals indicative of the position of said field, said switch means being connected to said source and being responsive to said switch signals for sequentially energizing said phase windings in the presence of said control pulses with leading phase relative to said field in a desired direction of rotation, said detector means comprising transformer means having primary and secondary winding means in a common axial plane, core means for said winding means forming a magnetic path alternately openable and closable by said armature member during a revolution of said rotor, and oscillator means connected across said primary winding means for inducing in said secondary winding means an output voltage depending upon the angular position of the rotor.

10. An electric motor comprising a rotor with a constant magnetic field rotatable about an axis transverse to said field, a stator provided with a plurality of phase windings angularly spaced about said axis in a transverse plane, energizing means for said phase windings, a source of width-modulated control pulses responsive to an error signal and having a recurrence period which is short in comparison with the minimum transit time of said field from one phase winding to the next, a source of directional signals, switch means for selectively connecting said phase windings to said energizing means, an armature member rotatably coupled with said rotor for entrainment thereby, and electromagnetic detector means fixedly positioned adjacent said armature member for controlling said switch means by the transmission of switching signals indicative of the position of said field, said switch means being connected to said sources and being responsive to said switching signals for sequentially energizing said phase windings in the presence of said control pulses with leading phase relative to said field in a direction of rotation determined by said directional signals, said detector means comprising transformer means having primary and secondary winding means in a common axial plane, core means for said winding means forming a magnetic path alternately openable and closable by said armature member during a revolution of said rotor, and oscillator means connected across said primary winding means for inducing in said secondary winding means an output voltage depending upon the angular position of said rotor.

11. An electric motor comprising a rotor with a constant magnetic field rotatable about an axis transverse to said field, a stator provided with a plurality of pairs of radially aligned phase windings angularly spaced about said axis in a transverse plane, energizing means for said phase windings, a source of width-modulated control pulses responsive to an error signal and having a recurrence period which is short in comparison with the minimum transit time of said field from one phase winding to the next, switch means for selectively connecting said phase windings to said energizing means, an armature member rotatably coupled with said rotor for entrainment thereby, and at least one pair of electromagnetic detectors fixedly positioned at angularly spaced locations adjacent said armature member for controlling said switch means by the transmission of different signal combinations indicative of the position of said field, said switch means being connected to said source and being responsive to said signal combinations for sequentially energizing said phase windings in the presence of said control pulses and with leading phase relative to said field in a desired direction of rotation, said detector means comprising transformer means having primary and secondary winding means in a common axial plane, core means for said winding means forming a magnetic path alternately openable and closable by said armature member during a revolution of said rotor, and oscillator means connected across said primary winding means for inducing in said secondary winding means an output voltage depending upon the angular position of said rotor.

12. An electric motor comprising a rotor with a constant magnetic field rotatable about an axis transverse to said field, a stator provided with a plurality of pairs of radially aligned phase windings angularly spaced about said axis in a transverse plane, energizing means for said phase windings, a source of width-modulated control pulses responsive to an error signal and having a recurrence period which is short in comparison with the minimum transit time of said field from one phase winding to the next, a source of directional signals, switch means for selectively connecting said phase windings to said energizing means, an armature member rotatably coupled with said rotor for entrainment thereby, and at least one pair of electromagnetic detectors fixedly positioned at angularly spaced locations adjacent said armature member for controlling said switch means by the transmission of different signal combinations indicative of the position of said field, said switch means being connected to said sources and being responsive to said signal combinations for sequentially energizing said phase windings in the presence of said control pulses and with leading phase relative to said field in a direction of rotation determined by said directional signals, said detector means comprising transformer means having primary and secondary winding means in a common axial plane, core means for said winding means forming a magnetic path alternately openable and closable by said armature member during a revolution of said rotor, and oscillator means connected across said primary winding means for inducing in said secondary winding means an output voltage depending upon the angular position of said rotor.

13. A motor as defined in claim 12 wherein said switch means comprises commutating transistors respectively in series with said phase windings and a logic circuit connecting the inputs of said transistors to the output of said sources and said detectors.

References Cited by the Examiner
UNITED STATES PATENTS

| | | | |
|---|---|---|---|
| 1,939,433 | 12/1933 | Bedford | 318—138 |
| 2,939,437 | 12/1933 | Currier | 318—138 |
| 3,091,728 | 5/1963 | Hogan | 318—138 |
| 3,112,433 | 11/1963 | Fairbanks | 318—138 X |
| 3,117,268 | 1/1964 | Madsen | 310—49 |
| 3,127,548 | 3/1964 | Van Emden | 318—254 |
| 3,210,631 | 10/1965 | Niccolls | 318—138 |

ORIS L. RADER, *Primary Examiner.*

C. E. ROHRER, G. FRIEDBERG, *Assistant Examiners.*